United States Patent [19]
Mayers

[11] 3,809,264
[45] May 7, 1974

[54] METHOD OF LOADING CARGO CONTAINERS

[75] Inventor: Gerald K. Mayers, Portland, Oreg.

[73] Assignee: Container Bins, Inc., Portland, Oreg.

[22] Filed: May 17, 1972

[21] Appl. No.: 254,227

[52] U.S. Cl. ............... 214/302, 214/6 G, 214/310, 214/621
[51] Int. Cl. ............................................. B65g 57/02
[58] Field of Search ........... 214/6 P, 6 G, 41, 75 G, 214/310, 301, 302, 621, 654

[56] References Cited
UNITED STATES PATENTS

| | | | |
|---|---|---|---|
| 3,040,914 | 6/1962 | Johnson et al. | 214/310 |
| 2,256,453 | 9/1941 | Bomar | 214/310 |
| 2,707,573 | 5/1955 | Balwics | 214/310 |
| 3,434,603 | 3/1969 | Horman | 214/6 DK |
| 2,651,428 | 9/1953 | Dickson | 214/654 |
| 2,698,107 | 12/1954 | Ericson | 214/654 |
| 3,059,796 | 10/1962 | Dansereau | 214/621 |
| 2,558,388 | 6/1951 | Richardson | 214/620 |

*Primary Examiner*—Gerald M. Forlenza
*Assistant Examiner*—Lawrence J. Oresky
*Attorney, Agent, or Firm*—Klarquist, Sparkman, Campbell, Leigh, Hall and Whinston

[57] ABSTRACT

Shipping containers are loaded with cargo, such as bags of seed, by placing the bags in a generally U-shaped bin having a width substantially equal to that of the open loading end of the cargo container and a height substantially equal to a whole number fraction of the height of such open end. The bags are loaded fully across the width of the bin and substantially evenly with the top thereof, whereupon the loaded bin is inserted into the container through the open end and the cargo elements are pushed out en masse as the bin is simultaneously withdrawn. A second batch of cargo is similarly loaded, being placed above and in contact with the top of the first batch, thereby to load a widthwise row of cargo elements fully to the top of the container and completely across the width thereof.

1 Claim, 6 Drawing Figures

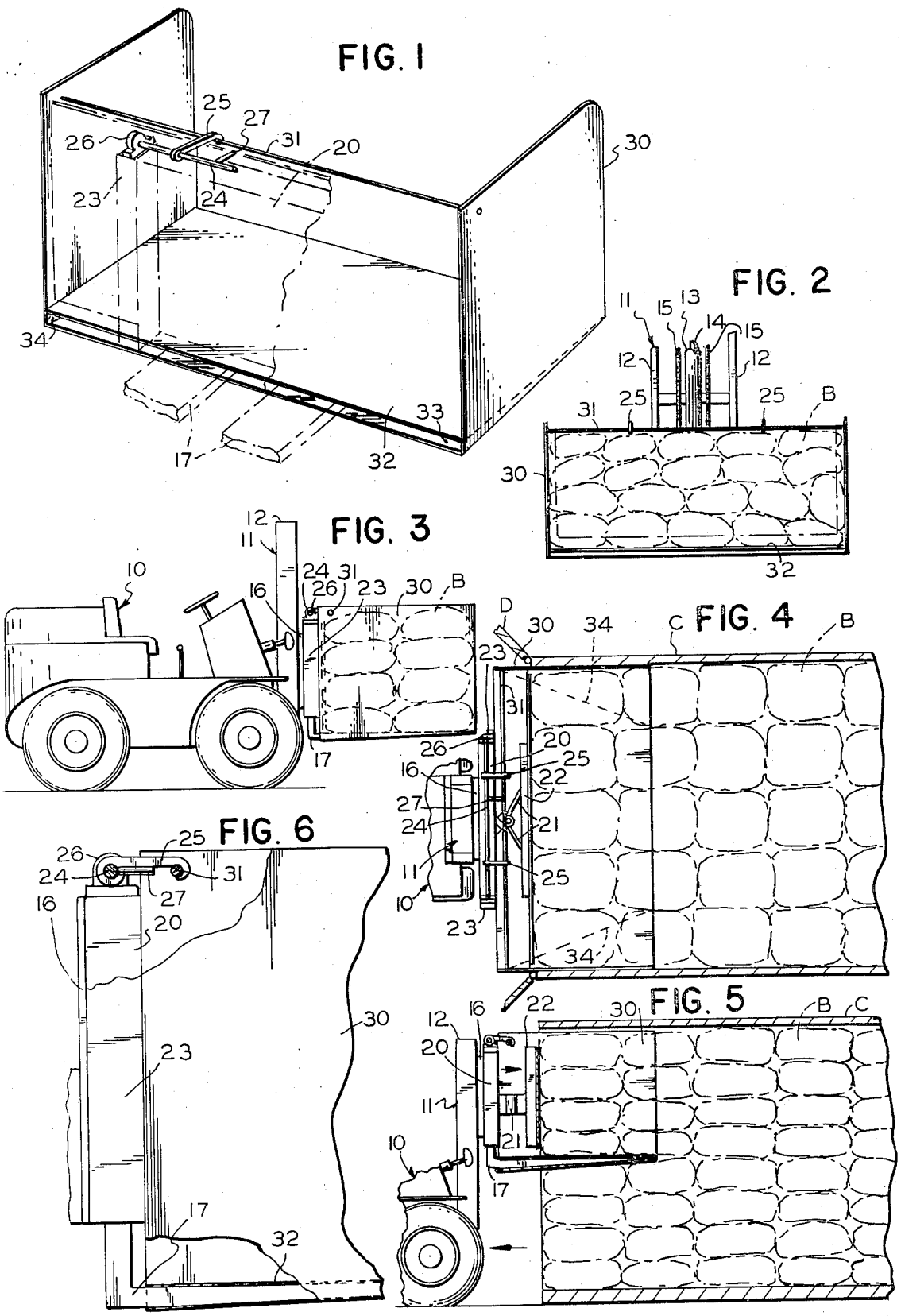

METHOD OF LOADING CARGO CONTAINERS

BACKGROUND OF THE INVENTION

This invention relates to the loading of cargo containers and, more particularly, to the loading of such containers with cargo elements that may be mechanically pushed into place.

Cargo containers are coming into increased favor in the shipping industry. They make it possible to load commodities or products at their point of origin into a structure that can be locked and sealed and which does not have to be opened until it reaches its point of destination. Obviously, "containerized" cargo has significant advantages with respect to the protection and security of cargo during the course of its transportation.

Cargo containers are generally loaded through an openable end which is provided with a door capable of being locked and sealed. Completely filling the container, however, has been a difficult and time consuming job. This is due to the fact that since the container is closed on top, there is restricted head room, and such makes it difficult to load the container fully to the top. This is especially so when the cargo is heavy.

In the past, bags of grass seed, grain or similar heavy cargo elements have been loaded on cargo boards, fork-lifted to the container, manually lifted from the cargo board and placed in the container. Where a fully loaded container would, for example, require 220 sacks of seed, three and one-half to four hours of loading time were required.

More recently cargo containers have been loaded using forklift trucks equipped with pusher attachments. Bags of seed or similar cargo were placed on sheets of cardboard, two across and four high, and tied with twine. A sheet of cardboard with the eight bags thereon was then picked up by the lift truck, driven to the container and pushed therein without any manual assistance. The cardboard, however, was loaded along with the bags and the entire operation required approximately two hours to load the container.

Accordingly, it is the primary object of the present invention to provide a new and improved method of loading cargo containers with cargo elements that may be mechanically pushed into place.

It is a further object of the present invention to provide such a method that can utilize presently available forklift trucks.

It is a still further object of the present invention to provide apparatus which can be used in combination with such forklift trucks efficiently and completely to load cargo containers with heavy cargo elements.

SUMMARY OF THE INVENTION

The apparatus of the present invention is adapted for use in combination with a standard forklift truck having lift forks and a pusher mechanism including a pusher face equipped to push cargo supported on the lift forks.

The apparatus comprises a generally U-shaped loading bin which can be supported on the lift forks and inserted into the open loading end of a cargo container. The bin is of a width substantially equal to the width of the open loading end of the container and is of a height substantially equal to a whole number fraction of the height of such opening. Means are disposed underneath the bin for slidably receiving the lift forks therein, and such means permit the lift forks to be withdrawn upon detachment of the bin from the lift truck. Means are also mounted on the lift truck for releasably clamping the bin to the truck, thereby to retain the lift forks within the receiving means when the pusher mechanism is active in pushing cargo out of the bin.

The method of the present invention comprises loading a first batch of individual cargo elements, such as sacks of seed, into the bin above described. The cargo elements are loaded fully across the width of the bin and substantially evenly with the top thereof. The bin is then inserted into the cargo container through the open loading end thereof to the termination point of previous loading, if any.

The method then comprises pushing the first batch of individual cargo elements en masse out of the bin and onto the floor of the container while simultaneously withdrawing the bin out from under the cargo elements and out of the container.

A second batch of individual cargo elements are then loaded into the bin (or into a second bin) in the same manner as the first batch. The thus loaded bin is then inserted a second time into the container, being placed above and in contact with the tops of the first batch of cargo elements. The second batch of cargo elements is then pushed en masse out of the bin to load the same on top of the first batch of cargo elements while simultaneously withdrawing the bin out from under such second batch and out of the container.

Although two such loadings will load a widthwise row of cargo elements fully to the top of the usual cargo container, the method contemplates repeating the enumerated steps a sufficient number of times to load any rectangular parallelepiped type of container fully to the top thereof with cargo elements extending completely across its width.

BRIEF DESCRIPTION OF THE DRAWINGS

FIG. 1 is a perspective view of a U-shaped loading bin used in connection with the instant invention.

FIG. 2 is an end view of the bin of FIG. 1 shown loaded with sacks of seed and positioned on a forklift truck prior to being inserted into a standard cargo container.

FIG. 3 is a side elevational view of the forklift truck carrying the loaded bin.

FIG. 4 is a top view showing the bin inserted into the container and the pusher mechanism on the forklift truck pushing a second batch of cargo elements out of the bin to load the same on top of a first batch of cargo elements while the bin is simultaneously being withdrawn from under such second batch of cargo elements.

FIG. 5 is a vertical sectional view of the operation depicted in FIG. 4.

FIG. 6 is an enlarged elevational view, with parts broken away, illustrating the attachment of the bin to the forklift truck.

DESCRIPTION OF THE PREFERRED EMBODIMENT

Referring to the drawings, there is illustrated a typical industrial or forklift truck 10 having a mast 11 comprising two generally upright hydraulically pivotal side members 12. Interposed between the members 12 is a hydraulic hoisting cylinder 13, the piston rod 14 of which is provided with a cross head and sheave (not shown) over which extend chains 15 having their lower front ends secured to a movable carriage or load carrier 16. Such typically comprises a load carrier platform in the form of longitudinally tapered lift forks 17.

The lift truck 10 is further provided with a pusher mechanism including a carriage back 20 attached to the member 16, scissor arms 21 attached to the back 20 and a pusher face 22 operable on the ends of the arms 21 to push cargo supported on the lift forks 17 forwardly at the instance of the operator.

A pair of tubular steel members 23 are mounted on the carriage back 20 and are joined by a round shaft 24 mounted in bearings 26 on the members 23. A pair of locking dogs 25 are mounted on the shaft 24 and are operable in tandem by a manually operable control rod 27 or by a solenoid to rotate from a generally horizontal (locking) position to a generally vertical (release) position as desired.

A generally U-shaped metal or plastic loading bin 30 is provided for use with the invention. Bin 30 is adapted to be inserted into the open loading end of a standard cargo container, and as such, is of a width substantially equal to the width of such open loading end; that is, for use with a standard cargo container, a width of seven foot two inches has been found satisfactory. The bin is further constructed of a height substantially equal to a whole number fraction of the height of the open loading end of the container; that is, for a standard cargo container, a bin height of 3 foot 4 inches has been found to be satisfactory as such is substantially equal to one-half of the open loading end of the container. When such a bin is loaded fully across the width thereof and substantially evenly with the top, a standard cargo container can be loaded fully to the top by two insertions of the bin. Finally, the bin is desirably constructed approximately 4 feet 6 inches long—that is, 4 feet 6 inches in the direction of longitudinal motion of the forklift truck—thereby to accommodate the double row of standard seed sacks illustrated.

The bin is provided with a three-quarter inch diameter steel bar or shaft 31 mounted at the top rear thereof for selective engagement with the locking dogs 25. It is further provided with a false bottom 32 extending fully thereacross to create an opening to receive the typically longitudinally tapered lift forks 17 therein and to permit the same to be easily withdrawn upon detachment of the bin from the truck. For example, the false bottom 32 may taper from a 2 ½ inch opening 33 at the rear to a position flush with the front of the bin, being supported by ribs 34 as shown.

In a typical loading operation approximately 40 bags B of seed constituting a first batch are loaded into the bin 30, five across, two deep and four high, such that the bags are loaded fully across the width of the bin and substantially evenly with the top thereof.

The lift forks 17 are inserted below the false bottom 32 and the locking dogs 25 are actuated to clamp them over the shaft 31, thereby to secure the loaded bin 30 to the lift truck 10. The lift truck is then driven to the site of the cargo container C and the loaded bin is inserted through the open door D thereof. The first batch of bags B are then pushed out of the bin en masse and onto the floor of the container while the bin is simultaneously withdrawn from under the bags and thence, out of the container.

A second bin 30 is similarly loaded with bags B constituting a second batch of cargo elements while the first batch is being inserted in the cargo container and unloaded. When the first bin is emptied, the lift truck is driven back to the initial loading site, the locking dogs 25 released to permit the lift forks 17 to be withdrawn from the false bottom 32 and the first bin detached, and the second loaded bin is exchanged therefor. Such second bin is then driven to the site of the cargo container C, inserted through the open end thereof and placed above and in contact with the tops of the first batch of cargo elements. Preferably the hydraulic mechanism of the lift truck is actuated at this point to press the second bin down on the tops of the first batch of bags to compress the same. Then the second batch is pushed out of the bin en masse to load the same on top of the first batch, the bin being simultaneously withdrawn from under the second batch of cargo elements and thence, out of the container. See FIGS. 4 and 5. Obviously, compressing the first batch prior to the pushing out of the second batch increases the compactness of the loading in the cargo container.

Generally, two such insertions will load a widthwise row of bags fully to the top of the container and, of course, fully across the width thereof. If, however, the method of the invention is used to load a freight car instead of a cargo container, a greater number of loadings may be required. In that case, the steps are merely repeated a sufficient number of times completely to load the parallelepiped type of receptacle fully to the top thereof.

The method of the invention is applicable, of course, for use with only one bin at a time. In that case, however, loading of the second batch of cargo elements in the bin must await return of the empty bin from the previous insertion.

The method and apparatus of the present invention not only eliminates the boarding required by prior fully manual loading methods, but also eliminates the cardboard sheets and twine previously used with pusher equipped forklift trucks. The tremendous efficiency of the present method and apparatus cuts loading costs and permits a much wider range of uses than either of the prior loading methods. Not only is the method much faster and more economically desirable, but it also makes a much better and more compact load, virtually eliminating damage thereto.

What is claimed is:

1. In combination with a forklift truck having lift forks tapered in the longitudinal direction thereof and a pusher mechanism including a pusher face adapted to push cargo supported on said lift forks forwardly of said truck, a cargo container to be loaded,
  a generally U-shaped loading bin adapted to be supported on said lift forks and inserted into the open loading end of said cargo container,
  said bin being of a width substantially equal to the width of said open loading end of said cargo container,
  said bin being of a height substantially equal to a whole number fraction of the height of said open loading end,
  said pusher face extending the full height and width of the interior of said bin, said bin having a generally planar projection-free bottom and a generally planar false bottom disposed above said bottom, said false bottom converging to meet said bottom flush with the front of said bin to form a thin edge, said bottom and said false bottom defining a longitudinally tapered opening therebetween, said opening being of a height slidably to receive said lift forks therein and to permit said lift forks freely to be withdrawn upon detachment of said bin from said lift truck, whereby said lift forks can lift said bin with respect to said lift truck when said forks are received in said opening, and means mounted on said lift truck for releasably attaching said bin to said truck thereby to retain said lift forks within said opening when said pusher mechanism is active in pushing cargo forwardly of said lift truck and out of said bin.

* * * * *